United States Patent
Summers et al.

(10) Patent No.: US 11,326,556 B2
(45) Date of Patent: May 10, 2022

(54) HYBRID ROCKET MOTOR WITH INTEGRAL OXIDIZER TANK

(71) Applicant: Raytheon Company, Waltham, MA (US)

(72) Inventors: Matt H. Summers, Marana, AZ (US); Jeremy C. Danforth, Tucson, AZ (US)

(73) Assignee: Raytheon Company, Walthan, MA (US)

( * ) Notice: Subject to any disclaimer, the term of this patent is extended or adjusted under 35 U.S.C. 154(b) by 0 days.

(21) Appl. No.: 17/035,880

(22) Filed: Sep. 29, 2020

(65) Prior Publication Data
US 2021/0108598 A1 Apr. 15, 2021

Related U.S. Application Data

(63) Continuation of application No. 15/044,490, filed on Feb. 16, 2016, now Pat. No. 10,823,115.

(51) Int. Cl.
*F02K 9/72* (2006.01)
*F02K 9/32* (2006.01)
(Continued)

(52) U.S. Cl.
CPC .............. *F02K 9/72* (2013.01); *B33Y 10/00* (2014.12); *B33Y 80/00* (2014.12); *F02K 9/10* (2013.01);
(Continued)

(58) Field of Classification Search
CPC ..... F02K 9/10; F02K 9/28; F02K 9/32; F02K 9/42; F02K 9/44; F02K 9/62; F02K 9/72; F02K 9/425; F02K 9/605
See application file for complete search history.

(56) References Cited

U.S. PATENT DOCUMENTS 3,143,446 A 8/1964 Berman
3,204,560 A 9/1965 Gustavson
(Continued)

OTHER PUBLICATIONS

International Search Report and the Written Opinion of the International Search Authority for corresponding International Application No. PCT/US2016/048387 dated Jun. 16, 2017.

*Primary Examiner* — Ehud Gartenberg
*Assistant Examiner* — Henry Ng
(74) *Attorney, Agent, or Firm* — Renner, Otto, Boisselle & Sklar LLP

(57) ABSTRACT

A hybrid rocket motor includes a solid fuel element, and an oxidizer tank containing an oxidizer. The solid fuel element adjoins and at least partially defines a combustion chamber in which the solid fuel and the oxidizer are burned, to produce thrust from the hybrid rocket motor. The oxidizer tank is at least partially within the combustion chamber, and the entire oxidizer tank may be within the combustion chamber. The oxidizer tank may be protected by an insulating material, which may also serve as a structural material that contains the pressure of the oxidizer. The insulating material and the fuel material may both be polymer-based materials, although they may be different materials having different characteristics, for example including different additives to the same polymer material. The fuel element and the oxidizer tank may be made by additive manufacturing processes, for example by adding different materials in different locations.

17 Claims, 1 Drawing Sheet

(51) Int. Cl.
    *F02K 9/10*           (2006.01)
    *B33Y 10/00*        (2015.01)
    *B33Y 80/00*       (2015.01)

(52) U.S. Cl.
    CPC ............ *F02K 9/32* (2013.01); *F05D 2230/22* (2013.01); *F05D 2230/24* (2013.01); *F05D 2230/30* (2013.01); *F05D 2230/53* (2013.01)

(56) References Cited

U.S. PATENT DOCUMENTS

| | | |
|---|---|---|
| 3,358,453 A | 12/1967 | Swet |
| 3,613,597 A | 10/1971 | Britton |
| 3,806,064 A | 4/1974 | Parilla |
| 4,320,621 A | 3/1982 | Sayles |
| 5,119,627 A | 6/1992 | Bradford |
| 6,014,857 A | 1/2000 | Stinnesbeck |
| 6,311,479 B1 | 11/2001 | Lo |
| 6,367,244 B1 | 4/2002 | Smith |
| 6,499,287 B1 | 12/2002 | Taylor |
| 7,540,145 B2 | 6/2009 | Rutan |
| 8,191,351 B2 * | 6/2012 | Loehr ............... F02K 9/22 60/256 |
| 8,225,507 B2 | 7/2012 | Fuller |
| 8,601,790 B2 | 12/2013 | Fuller |
| 8,950,329 B2 | 2/2015 | Villarreal |
| 9,038,368 B2 | 5/2015 | Fuller |
| 9,429,104 B2 | 8/2016 | Fuller |
| 9,796,486 B1 | 10/2017 | Illsley |
| 2007/0261386 A1 | 11/2007 | Benson |
| 2010/0281850 A1 | 11/2010 | Fuller |
| 2011/0203256 A1 | 8/2011 | Chen |
| 2012/0060468 A1 | 3/2012 | Dushku |
| 2013/0255223 A1 | 10/2013 | Brady |
| 2014/0174313 A1 | 6/2014 | Villarreal |
| 2016/0356245 A1 | 12/2016 | Danforth |

\* cited by examiner

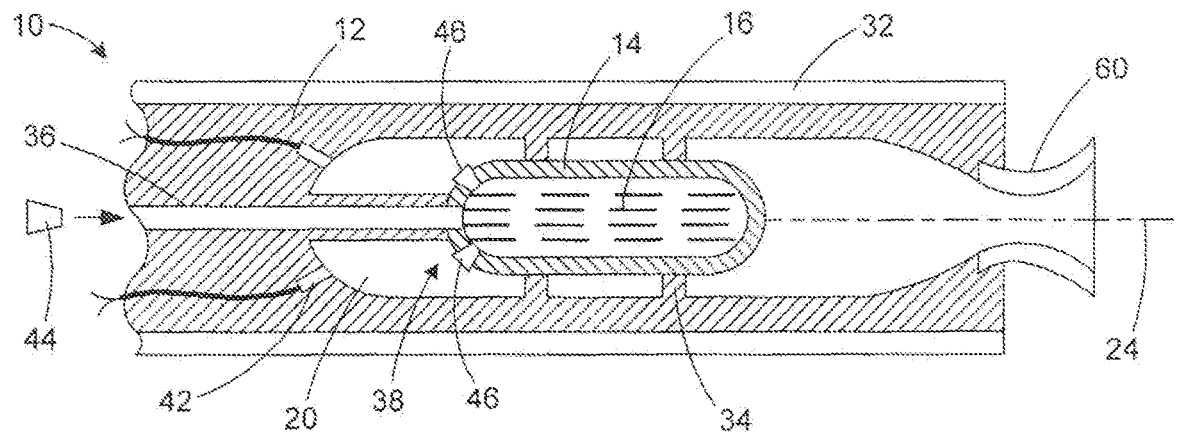
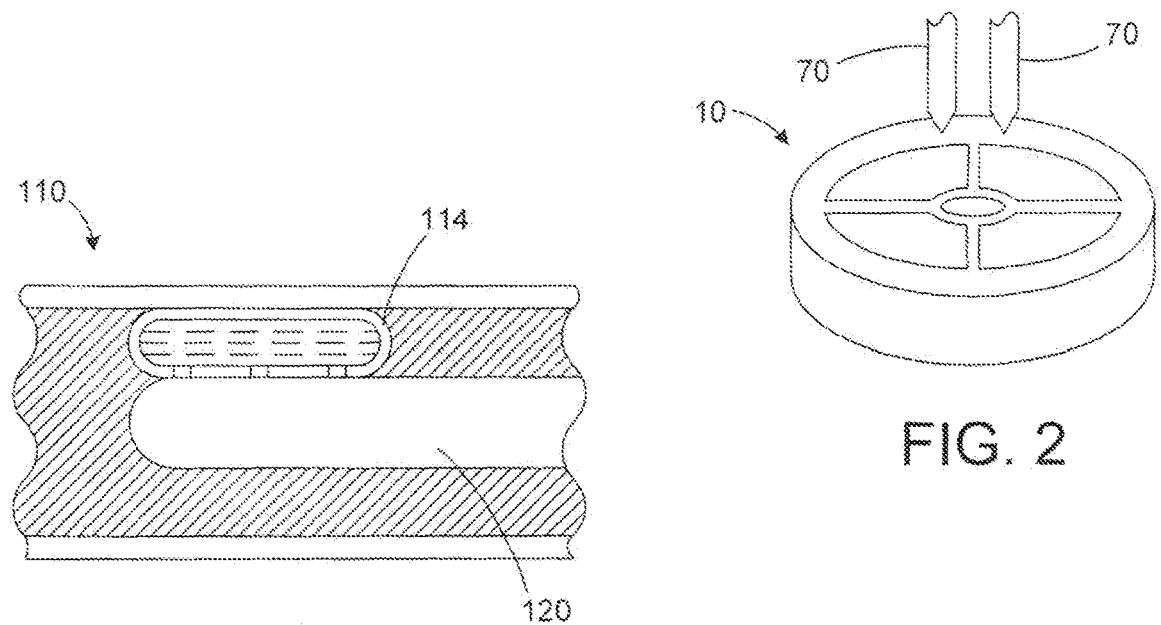
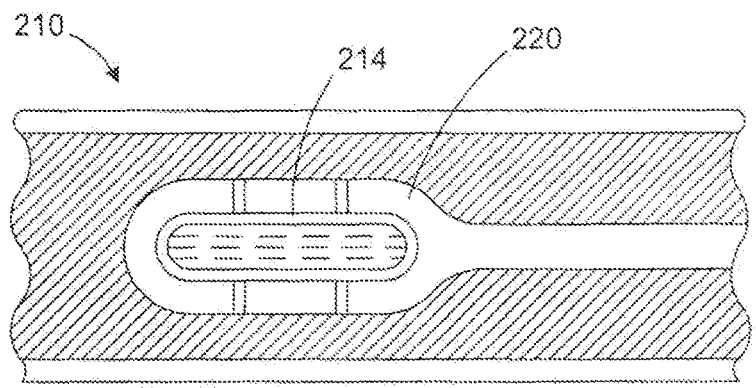

HYBRID ROCKET MOTOR WITH INTEGRAL OXIDIZER TANK

RELATED APPLICATIONS

This application is a continuation of U.S. application Ser. No. 15/044,490 filed Feb. 16, 2016, which is hereby incorporated herein by reference in its entirety.

FIELD OF THE INVENTION

The invention is in the field of rocket motors.

DESCRIPTION OF THE RELATED ART

Additive-manufactured fuel grains have been produced before, albeit for rocket motors using conventional metal casings and nozzles.

Hybrid rocket motors produce pressurized gasses from combustion of a solid fuel and a liquid oxidizer. Shortcomings of at least some prior hybrid motor configurations have included a lack of volumetric efficiency, and the need to provide hoses or other plumbing between a remote oxidizer tank, and a location where combustion occurs.

SUMMARY OF THE INVENTION

A hybrid rocket motor has an oxidizer tank wholly or partially within a combustion chamber in which the fuel-oxidizer chemical reaction takes place.

According to an aspect of the invention, a hybrid rocket motor includes: a solid fuel adjoining and at least partially defining a combustion chamber; and an oxidizer tank at least partially within the combustion chamber; wherein the solid fuel and a liquid oxidizer from the oxidizer tank are burned in the combustion chamber to produce thrust in the motor.

According to an embodiment of the device of any prior paragraph(s), the oxidizer tank is fully within the combustion chamber.

According to an embodiment of the device of any prior paragraph(s), the combustion chamber is cylindrical; and the oxidizer tank is located along a central longitudinal axis of the combustion chamber.

According to an embodiment of the device of any prior paragraph(s), the casing has injection ports for releasing the oxidizer from the oxidizer tank into the combustion chamber.

According to an embodiment of the device of any prior paragraph(s), the solid fuel includes a fuel plastic material.

According to an embodiment of the device of any prior paragraph(s), the solid fuel also includes an energetic additive to the fuel plastic material.

According to an embodiment of the device of any prior paragraph(s), the oxidizer tank includes an oxidizer tank plastic material.

According to an embodiment of the device of any prior paragraph(s), the oxidizer tank plastic material is the same as a fuel plastic material that is at least part of the solid fuel.

According to an embodiment of the device of any prior paragraph(s), the oxidizer tank plastic material different from a fuel plastic material that is at least part of the solid fuel.

According to an embodiment of the device of any prior paragraph(s), the tank is supported by a series of ribs that connect the tank to an outer casing of the motor that surrounds the combustion chamber.

According to an embodiment of the device of any prior paragraph(s), wherein the tank and the solid fuel are parts of a single unitary piece of material.

According to an embodiment of the device of any prior paragraph(s), the single unitary piece that includes the fuel and the tank are formed by additive manufacturing.

According to an embodiment of the device of any prior paragraph(s), the rocket motor is part of a flying vehicle.

According to another aspect of the invention, a method of making a hybrid rocket motor, the method including: using additive manufacturing to form a fuel element and an oxidizer tank of the rocket motor, with a combustion chamber within the fuel element, and with the oxidizer tank at least partially within the combustion chamber; and filling the oxidizer tank with a liquid oxidizer.

According to an embodiment of the method of any prior paragraph(s), the using additive manufacturing includes extruding fuel material to produce the fuel element, and oxidizer tank material to produce the oxidizer tank.

According to an embodiment of the method of any prior paragraph(s), the fuel material and the oxidizer tank material are extruded by respective extruders.

According to an embodiment of the method of any prior paragraph(s), the using the additive manufacturing also includes forming a support structure from the oxidizer tank.

According to an embodiment of the method of any prior paragraph(s), the using additive manufacturing includes forming a fill line for; and According to an embodiment of the method of any prior paragraph(s), the method further includes, subsequent to the using additive manufacturing, filling the oxidizer tank with an oxidizer.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

FIG. 1 is a side sectional view of a hybrid rocket motor in accordance with an embodiment of the invention.

FIG. 2 is an oblique view illustrating a manufacturing process for making the rocket motor of FIG. 1.

FIG. 3 is a side sectional view of a hybrid rocket motor in accordance with another embodiment of the invention.

FIG. 4 is a side sectional view of a hybrid rocket motor in accordance with yet another embodiment of the invention.

DETAILED DESCRIPTION

A hybrid rocket motor includes a solid fuel element, and an oxidizer tank containing an oxidizer. The solid fuel element adjoins and at least partially defines a combustion chamber in which the solid fuel and the oxidizer are burned, to produce thrust from the hybrid rocket motor. The oxidizer tank is at least partially within the combustion chamber, and the entire oxidizer tank may be within the combustion chamber. The oxidizer tank may be protected by an insulating material, which may also serve as a structural material that contains the pressure of the oxidizer. The insulating material and the fuel material may both be polymer-based materials, although they may be different materials having different characteristics, for example including different additives to the same polymer material. The fuel element and the oxidizer tank may be made by additive manufacturing processes, for example by adding different materials in different locations as part of a single process.

Referring initially to FIG. 1, a hybrid rocket motor 10 includes a solid fuel element 12 and an oxidizer tank 14 that contains an oxidizer 16. The solid fuel element 12 may be the main structure of the rocket motor 10, and may surround and define a combustion chamber 20 in which combustion between the fuel and the oxidizer occurs. The oxidizer tank 14 may be fully within combustion chamber 20, for example being located along a longitudinal axis 24 of the rocket motor 10, with a portion of the combustion chamber 20 radially outside of and fully surrounding the tank 14.

The solid fuel element 12 may be all or a part of the supporting structure that contains the combustion chamber 20 and holds the tank 14 in place. Alternatively, there may be a single material that serves as both the fuel for the combustion, and as the structural support for the tank 14 (and to contain the combustion in the chamber 20). There may be an outer casing 32 of the motor 10, which may be made completely or in part of the fuel material of the fuel element 12, that surrounds and contains the combustion chamber 20. A series of radial ribs 34 may extend inward from the outer casing 32 to support the tank 14.

The tank 14 may have a fill port 36, for filling the tank 14 with the oxidizer 16. In addition, the tank 14 may have a series of injection ports 38 that are used to release the oxidizer 16 into combustion chamber 20 once the combustion process is initiated by an igniter 42. The fill port 36 may be sealed with a fill port plug 44 after filling of the tank 14 with the oxidizer 16. The oxidizer injection ports 38 may be initially blocked with plugs 46 that are removed are part of the process of initiating combustion in the chamber 20.

The tank 14 and its supporting structure (the outer casing 32 and the ribs 34) may be made in an additive manufacturing process. "Additive manufacturing" is broadly used herein to refer to processes in which features are formed by selectively adding material, as opposed to removing material from an already-existing larger structure (subtractive manufacturing). Such a process is often referred to generally as three-dimensional printing. The additive manufacturing process allows the desired geometry of the rocket motor 10, to be formed without additional manufacturing steps, such as machining. The fuel element 12, the tank 14, and/or the supporting structure for the tank 14, may be built up layer-by-layer in the longitudinal direction of the rocket motor 10. Many types of additive manufacturing processes may be used to produce the parts of the motor 10. One example of a suitable process is fused deposition, where material is deposited at selected locations to build up the elements or parts layer by layer, with the deposited material fusing to previous layers of material. The fused deposition may involve movement of one or more extruders with respective heated heads, to deposit extruded material in desired locations. A variety of other additive manufacturing processes, such as selective laser sintering (SLS), stereo lithography (SLA), are possible as alternatives.

The parts of the rocket motor 10 maybe made of any of a variety of suitable materials. The material or materials of the parts may be selected so as to achieve desired characteristics of the motor 10, as well as being usable for the manufacturing process. One suitable class of materials are polymer materials, with suitable additives for obtaining desired material characteristics. For example, one or more thermoplastics may be used, with suitable additives for use as a fuel or an insulating material. Additives may be used to increase fuel density (allows more mass to be packaged per unit volume), to increase burning rate during combustion (a higher burn rate means a higher mass flow, which means increased thrust), and/or to increase flame temperature (improves combustion efficiency and specific impulse which is thrust per unit mass of propellant). Metal hydrides could be added to the printed fuel to increase energy content. Alternatively, or in addition, ammonium perchlorate could be added to the printed plastic fuel to increase oxygen content. The additives may be in the form of particles of material, or may be in the form of droplets of liquid within a continuous material, such as a thermoplastic. As another alternative, the fuel may be a thermoplastic or other continuous material without any additives in it.

Other base or continuous materials are possible. Non-limiting examples include rubber, dense plastics, and metals or metal compounds, such as magnesium or copper oxide. The tank 14, the fuel 12, and the structure supporting these elements may have the same base (continuous) material. Different additives may be put into the same base material to result in different properties. Examples for such additives for the material of the fuel element 12 are described above.

A plastic material for the tank 14 may be sufficient to protect the oxidizer 16 from heat, since plastics are often poor conductors of heat. The material for the tank 14 may have additives or different materials for any (or a combination of) reasons, such as to provide better insulation against heat, to enhance structural strength, or to better resist ablation or other removal of the material during combustion in the chamber 20. In the case of improved insulative properties, additives or materials that might be suitable for this would be carbon or graphite, silica, fiberglass, cork, and the like. In the case of improved strength or mechanical properties additives or materials that might be suitable for this would be aluminum alloys, titanium alloys, steel alloys, as well as carbon and glass fibers. In the case of improved resistance to ablation or erosion additives or materials that might be suitable for this would be carbon or graphite, silica, fiberglass, as well as refractory metals and alloys such as tungsten, molybdenum, nickel, Inconel, thoriated-tungsten, tungsten-rhenium, tungsten-carbide, and the like.

The oxidizer 16 may be any of a variety of suitable liquid oxidizer materials, for example oxygen or nitrous oxide, or a blend of liquid oxygen and nitrous oxide.

The additive manufacturing of the rocket motor 10 may be accomplished using one or more extruders to extrude a suitable material or materials, in suitable locations. Alternatively, material for the rocket motor 10 may be fused to build up the motor 10 layer by layer. Either way, the motor 10 may be built up in a configuration that would be difficult to form in a practical way by other methods of manufacture, such as molding or machining.

The manufacture of the motor 10 may involve placing preformed structures during the manufacturing process, with other parts of the motor 10 formed around the preformed structures. Examples of such preformed structures include fittings and nozzles, such as a nozzle 60 that is part of the motor 10. Alternatively, the motor 10 may be nozzleless, or the nozzle 60 may be formed using an additive manufacturing method.

Characteristics of the tank 14, such as its shape, material, and/or thickness, may be selected in order to maintain structural integrity of the tank 14 throughout the firing of the rocket motor 10. Material of the tank 14 may be removed and/or weakened during burning of the fuel in the chamber 20. However, at the same time the oxidizer 16 is being consumed by the combustion, with the oxidizer 16 initially at a high pressure (e.g., 1000 psi), and then reducing in pressure. This reduces the amount of the oxidizer 16 remaining in the tank 14, and therefore the pressure in the tank 14. Thus the ability of the tank 14 to retain its structural integrity in storing the oxidizer 16 is being reduced at the same time that the internal pressure load on the tank 14 is being reduced as well.

The rocket motor 10 may only be fired for a strictly limited, for example 6 or 7 seconds (or more broadly 1 to 20 seconds), such that the effect of thermal forces on the tank 14, and structural weakening of the tank 14, may be limited. The time over which the rocket motor 10 fires may be limited by the amount of the oxidizer 16 initially in the tank 14, for example. A limited-firing-time rocket motor 10 may be used as a steering thruster, for example, or may be used as a main thruster for a device with a short flight time, such as an air-to-air missile.

The motor 10 may be formed as described above, and then the tank 14 may be filled with the oxidizer 16 through the fill port 36, with the fill port 36 then blocked with the plug 44. Thus assembled, the motor 10 may then be stored, such as part of a device such as a spacecraft or missile, for a considerable time (e.g., months or years) before use.

In operation, firing of the rocket motor 10 would begin with activating the igniter 42. The igniter 42 may be a combustible compound that is rapidly consumed and generates sufficient heat to initiate more general combustion of the fuel 12. The ignition process also dislodges the fill injection port plugs 38, to allow flow of the oxidizer 16 into the combustion chamber 20. Flow of the oxidizer 16 into the combustion chamber 20 allows for continuation of combustion in the chamber 20. Some of the fuel 12 is also burned away in this combustion. Parts of the tank 14 may also be burned as fuel and/or otherwise removed by the combustion. The combustion products (pressurized gasses produced by the combustion) exit the rocket motor 10 to provide thrust. The combustion products may pass through a nozzle, such as the nozzle 60, that may enhance the thrust from the rocket motor 10, such as by transitioning the flow of the pressurized gasses from subsonic flow to supersonic flow.

The rocket motor 10 may be used in any of a variety of devices, for any of a variety of purposes. The rocket motor 10 may be a part of a spacecraft or aircraft, to provide main thrust or to provide steering or for use as a divert thruster, to give some examples. The rocket motor 10 may be integrated into any of a variety of structural parts of a spacecraft or aircraft, for example being part of a fuselage, wing, or fin.

As one example of a suitable use, small versions of the hybrid rocket motor 10, for example having about the size of small consumer-use household batteries (e.g., AA batteries) could be produced and stored as separate structures, ready for use. Such small thrusters could be used for maneuvering, by placing them in small holes in a fuselage or other flying vehicle structure, with the small hybrid rocket motors held in place by mechanisms such as an adhesive or mechanical mechanisms, such as snap rings.

The rocket motor 10 offers numerous advantages. The rocket motor 10 provides for the possibility of a more efficient use of space than in prior hybrid rocket motors in which the oxidizer tank or containment is located away from the combustion chamber. The rocket motor 10 reduces the inert mass fraction of the system and allows a more compact package, with less system volume than in other hybrid rocket motors capable of providing similar amounts of thrust. For example, the inert mass faction may be reduced 10-20% (or a 10-20% increase in propellant mass) compared with prior hybrid rocket motors.

FIG. 2 illustrates one process for making parts of the rocket motor 10, in which two or more extruders 70 are used to deposit appropriate material, layer by layer, at appropriate locations, to build up elements of the rocket motor 10. The additive manufacturing extrusion process may be used to produce the fuel element 12, the oxidizer tank 14, and the supporting structure that supports the tank 14.

Other additive manufacturing or three-dimensional printing methods may be usable as alternatives to the extrusion process described in the previous paragraph. Such additive manufacturing processes are not limited to layerwise deposition, and may include other methods, such as, but not limited to: Selective Laser Sintering (SLS), Stereolithography (SLA), micro-stereolithography, Laminated Object Manufacturing (LOM), Fused Deposition Modeling (FDM), MultiJet Modeling (MJM), aerosol jet, direct-write, inkjet fabrication, and micro-dispense. Areas of overlap can exist between many of these methods, which can be chosen as needed based on the materials, tolerances, size, quantity, accuracy, cost structure, critical dimensions, and other parameters defined by the requirements of the object or objects to be made.

FIGS. 3 and 4 show alternative configurations. FIG. 3 shows a rocket motor 110 which includes a tank 114 is only partially within a combustion chamber 120, in that the tank 114 forms part of the boundary of the combustion chamber. FIG. 4 shows a rocket motor 210 which is nozzleless, with an oxidizer tank 214 within a combustion chamber 220 of a nozzleless rocket, thruster, or gas generator. In other respects, and details, the rocket motors 110 and 210 are similar to the rocket motor 10 (FIG. 1) described above.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A hybrid rocket motor comprising:
   an outer casing;
   a solid fuel radially inward of the outer casing, the solid fuel adjoining and at least partially defining a combustion chamber that is a cavity inside the solid fuel; and
   an oxidizer tank fully within the cavity, and within the solid fuel;

wherein the solid fuel and a liquid oxidizer from the oxidizer tank are burned in the combustion chamber to produce thrust in the hybrid rocket motor.

2. The hybrid rocket motor of claim 1,
wherein the combustion chamber is cylindrical; and
wherein the oxidizer tank is located along a central longitudinal axis of the combustion chamber.

3. The hybrid rocket motor of claim 1, wherein the solid fuel has injection ports for releasing the liquid oxidizer from the oxidizer tank into the combustion chamber.

4. The hybrid rocket motor of claim 1, wherein the solid fuel includes a fuel plastic material.

5. The hybrid rocket motor of claim 4, wherein the solid fuel also includes an energetic additive to the fuel plastic material.

6. The hybrid rocket motor of claim 1, wherein the oxidizer tank includes an oxidizer tank plastic material.

7. The hybrid rocket motor of claim 6, wherein the oxidizer tank plastic material is the same as a fuel plastic material that is at least part of the solid fuel.

8. The hybrid rocket motor of claim 6, wherein the oxidizer tank plastic material is different from a fuel plastic material that is at least part of the solid fuel.

9. The hybrid rocket motor of claim 1, wherein the oxidizer tank is supported by a series of ribs that connect the oxidizer tank to an outer casing of the hybrid rocket motor that surrounds the combustion chamber.

10. The hybrid rocket motor of claim 1, wherein the oxidizer tank and the solid fuel are parts of a single unitary piece of material.

11. The hybrid rocket motor of claim 10, wherein the single unitary piece that includes the solid fuel and the oxidizer tank is formed by additive manufacturing.

12. The hybrid rocket motor of claim 1, wherein the hybrid rocket motor is part of a flying vehicle.

13. A method of making a hybrid rocket motor, the method comprising:
using additive manufacturing to form a solid fuel element and an oxidizer tank of the hybrid rocket motor radially inward of an outer casing of the hybrid rocket motor, with a combustion chamber that is a cavity within the solid fuel element, and with the oxidizer tank fully within the cavity; and
filling the oxidizer tank with a liquid oxidizer;
wherein the solid fuel element and the liquid oxidizer from the oxidizer tank are configured to be burned in the combustion chamber to produce thrust in the hybrid rocket motor.

14. The method of claim 13, wherein the using additive manufacturing includes extruding fuel material to produce the solid fuel element, and an oxidizer tank material to produce the oxidizer tank.

15. The method of claim 14, wherein the fuel material and the oxidizer tank material are extruded by respective extruders.

16. The method of claim 13, wherein the using the additive manufacturing also includes forming a support structure for the oxidizer tank.

17. The method of claim 13,
wherein the using additive manufacturing includes forming a fill line for filling the oxidizer tank; and
further comprising, subsequent to the using additive manufacturing, filling the oxidizer tank with the liquid oxidizer.

* * * * *